United States Patent [19]

Thompson

[11] Patent Number: 4,463,374
[45] Date of Patent: Jul. 31, 1984

[54] COLOR PLOTTER INTERFACE AND CONTROL CIRCUIT

[75] Inventor: Leroy Thompson, Laguna Beach, Calif.

[73] Assignee: Trilog, Inc., Irvine, Calif.

[21] Appl. No.: 323,318

[22] Filed: Nov. 20, 1981

[51] Int. Cl.³ .............................................. H04N 1/46
[52] U.S. Cl. ........................................ 358/78; 358/75
[58] Field of Search ....................... 358/75, 77, 78, 52, 358/56, 166, 284; 346/46, 105, 106

[56] References Cited

U.S. PATENT DOCUMENTS

| | | | |
|---|---|---|---|
| 3,604,846 | 9/1971 | Behane | 358/78 |
| 4,081,828 | 3/1978 | Jones et al. | 358/75 |
| 4,308,553 | 12/1981 | Roetling | 358/75 |

Primary Examiner—Tommy P. Chin
Attorney, Agent, or Firm—Freilich, Hornbaker, Rosen & Fernandez

[57] ABSTRACT

Interface and control apparatus for translating color video signals from a video terminal or the like into control signals useful by a dot matrix impact printer/plotter for producing a hard copy image. The color video signals are digitized and used to address a programmed read only memory having a plurality of addressable locations. The memory stores a table for translating color video signals defining a three-dot video pixel into control signals enabling a printer/plotter apparatus to produce a hard copy image of a substantially equivalent four-dot printer/plotter pixel.

9 Claims, 7 Drawing Figures

FIG. 2

COLOR PLOTTER INTERFACE AND CONTROL CIRCUIT

BACKGROUND OF THE INVENTION

This invention relates generally to dot matrix printer/plotter systems for producing multiple color hard copy images. More particularly, the invention relates to interface and control apparatus responsive to video color signals from a video terminal or the like for generating control signals for enabling a printer/plotter apparatus to produce multiple color hard copy images.

Video terminals utilizing color cathode ray tubes, e.g. the Tektronics 4027 color terminal, are well known and are used extensively in various applications, as for displaying computer generated data. The picture displayed by the cathode ray tube can be considered as being comprised of a great number of video picture elements or pixels, each of which consists of a cluster of three contiguous dot areas for respectively producing the colors red, green, and blue. At any point in time, the color content of a particular video pixel is defined by three separate video signals. Whereas the three contiguous dot areas of a video pixel can be created essentially simultaneously, dot matrix printer/plotters cannot typically lay down different colored contiguous dots simultaneously. Moreover, whereas the video pixel may be considered as being comprised of a triangular dot area cluster, typical printer/plotter systems lay down dots in orthogonal rows and columns and thus are not well suited for exactly reproducing a video pixel.

Although the invention is applicable to various types of dot matrix printer/plotter systems, e.g. impact or ink jet, the invention will, for convenience, be described herein primarily with respect to a dot matrix line impact printer/plotter of the type disclosed in U.S. Pat. No. 4,289,069. The printer/plotter disclosed therein employs a hammer bank carrying a plurality of individually actuable hammers mounted for reciprocating movement along a print row. Each hammer is capable of printing a single dot in each position of the hammer bank, but as the bank is shuttled along the print row, each hammer can print multiple dots along the row. After one row of dots is printed, the paper can be moved incrementally past the print row to then enable the next dot row to be printed. An ink ribbon having different color zones is positioned to allow the printing of different color dots which can be interleaved on the hard copy to produce desired color tones.

SUMMARY OF THE INVENTION

The present invention is directed to apparatus responsive to video color signals derived from a video terminal or the like for producing control signals for enabling a dot matrix printer/plotter to produce a multiple color hard copy image.

In accordance with a preferred embodiment, three-dot video pixel information is used to address a read only memory to access four-dot printer/plotter pixel information.

In accordance with the preferred embodiment, a multiple color hard copy image is formed by first incrementing the paper to be printed upon past the print row, dot-row by dot-row to lay down rows of dots of a first color. Then, the paper is moved in a reverse direction and subsequently incremented again past the print row to lay down rows of dots of a second color. Thereafter, the paper is again moved on a reverse direction and again incremented past the print row to lay down rows of dots of a third color.

In accordance with another aspect of the preferred embodiment, a color signal selection circuit receives data accessed from the memory and, responsive to a color control signal from the printer/plotter control logic, selects and passes data associated with a particular printer/plotter color while inhibiting passage of data associated with other printer/plotter colors. Responsive to changes in the color control signal, the color signal selection circuitry successively passes each group of printer/plotter control signals corresponding to each of the discrete printer/plotter colors.

DESCRIPTION OF THE DRAWINGS

FIG. 2 depicts three dot video pixels and equivalent four dot printer/ploter pixels along with representative control signals for controlling the printer/plotter.

DETAILED DESCRIPTION

Figure 1:
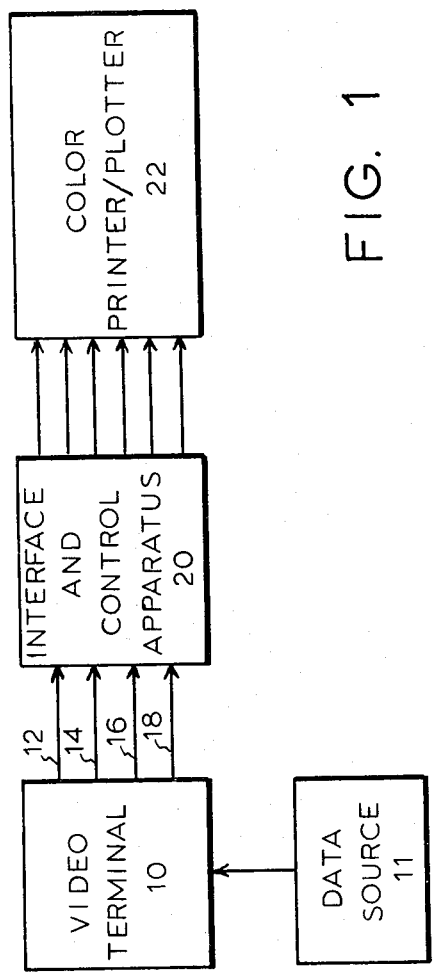
FIG. 1 is a block diagram depicting the utilization of an interface and control apparatus for coupling a video terminal to a multiple color printer/plotter.

Attention is initially directed to FIG. 1 which depicts an interface and control apparatus 20 for coupling a typical color video terminal 10, e.g. the Tektronics 4027, to a color printer/plotter 22. The video terminal 10 typically employs a color cathode ray tube which can be driven, for example, by a data source 11, such as a digital computer. The interface and control apparatus 20 translates video color signals derived from terminal 10 into control signals for enabling the printer/plotter 22 to produce a multiple color hard copy image substantially replicating the image displayed by the terminal 10.

Video terminal 10 typically utilizes red, green and blue video color signals to display images which may be considered as being comprised of a great number of video picture elements or pixels, each of which consists of a cluster of three contiguous dot areas for respectively producing the colors red, green and blue. The red, green and blue video signals are assumed to be available at terminal outputs 12, 14, and 16 respectively. Additionally, a composite video synchronization signal is assumed to be available at video terminal output 18, although in some commercially available terminals, the video sydnchronization information is superimposed on the video color signals. The interface and control apparatus 20 responds to the signals available at terminal outputs 12, 14, 16, and 18 to produce control signals usable by the printer/plotter 22 for creating four-dot (2×2) pixels on hard copy.

Figure 2:
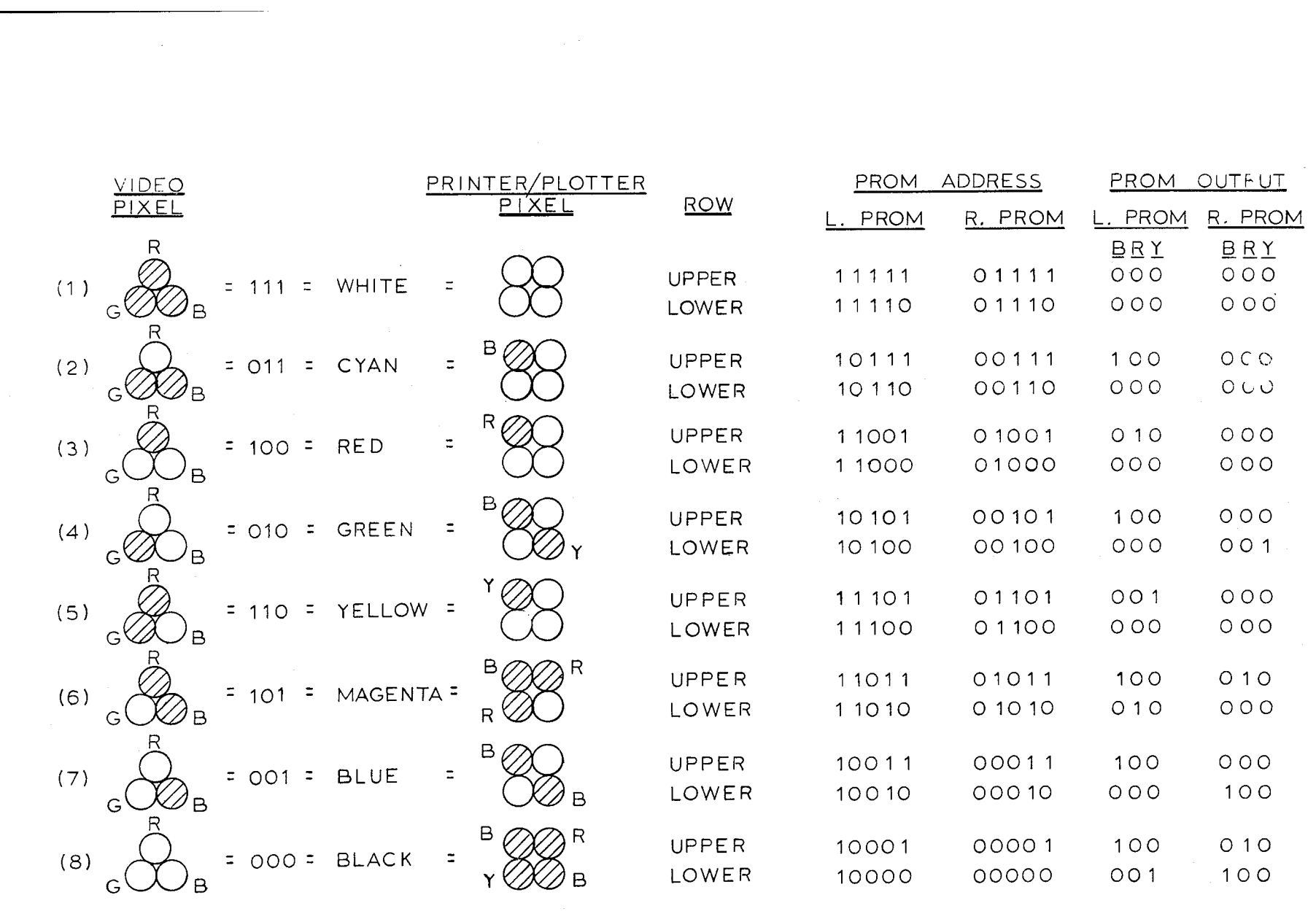

To understand the necessity for translating video terminal color signals into printer/plotter control signals, the relationship between a video pixel and a printer/plotter pixel should be understood. In the preferred embodiment, the video terminal 10 displays multicolor information by means of illuminating picture elements (pixels) on a CRT screen. Each video pixel comprises a three-dot triangular cluster as depicted in FIG. 2, including one dot each of red, green, and blue color information, any one of which may be considered as being either on or off. As will be explained hereinbelow, the interface and control apparatus 20 converts video data associated with each three-dot video pixel into digital control signals usable by the printer/plotter 22 to construct four-dot (2×2) printer/plotter pixels comprised of upper left and right dots and lower left and right dots.

It should be recognized that if each dot of a three-dot video pixel can be considered as being either on or off, then it is possible for the video signals to define any one of the eight different video pixels. These eight different possible video pixels are depicted in FIG. 2 along with the corresponding printer/plotter pixels intended to be produced by the printer/plotter 22 controlled by the interface and control apparatus 20. It is initially pointed out that each dot area of a video pixel is dedicated to a specific color; e.g. the lower left dot is either green or off, but cannot be illuminated with a different color. In contrast, each dot area of the 2×2 printer/plotter pixel can be printed in any of the colors available on the ink ribbon. It is also pointed out that whereas video colors are generally formed by red, green and blue dots, printed colors are typically formed by red, blue, and yellow dots and it will accordingly be assumed that the ink ribbon has red, blue and yellow zones.

Figure 3:
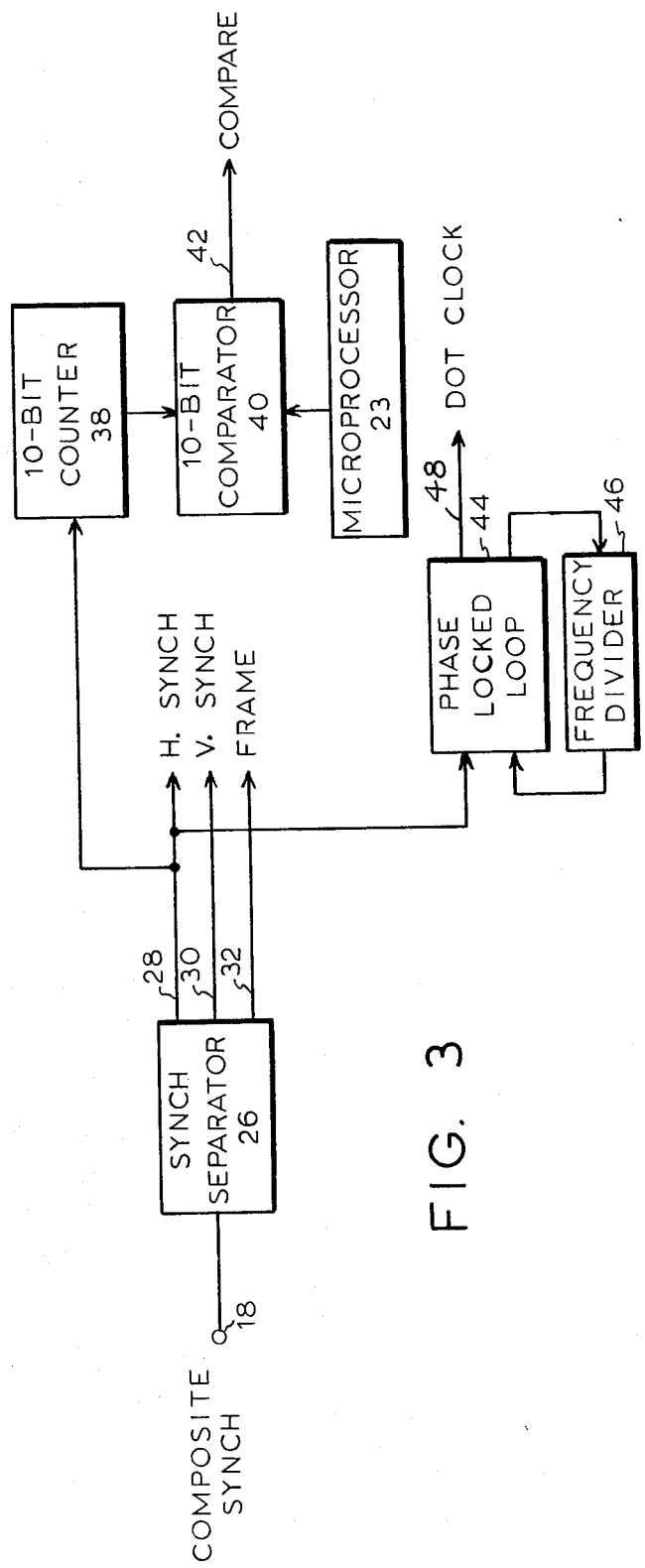
FIG. 3 is a block diagram of a portion of the interface and control apparatus of FIG. 1 for deriving synchronization signals.

Prior to discussing the detailed apparatus for converting a video pixel into a printer/plotter pixel, the nature and timing of the video image displayed by the cathode ray tube of terminal 10 should be understood. It shall be assumed that the video display or frame is formed by 1,024 horizontal lines comprised of two interlaced fields, each field containing 512 lines. For reference purposes, the lines of field 1 are sequentially numbered 1, 3, 5, 7,—1023 and the lines of field 2 are sequentially numbered 2, 4, 6, 8,—1024. Frame, field, and horizontal line synch pulses (depicted in the timing diagrams of FIGS. 5 and 6) are derived from the composite synchronization signal, available on video terminal output 18, by synch separator 26 depicted in FIG. 3. The horizontal synch pulses drive a ten-bit counter 38 which will be assumed to define a count sequence 1, 3, 5, 7,—1023, 2, 4, 6, 8,—1024. Thus, the count defined by counter 38 will always define the current horizontal line position of the beam of the video terminal cathode ray tube.

In accordance with the preferred embodiment of the invention, the printer/plotter 22 is controlled by microprocessor 23 to enable the printer/plotter to build up a hard copy image, dot row by dot row, and color by color, as the interface and control apparatus 20 samples the video terminal outputs 12, 14, 16 to derive the required video data. In order to derive the video data for a particular video terminal horizontal line, the microprocessor loads that line number into the ten-bit binary comparator 40. When the comparator 40 detects a match between the number loaded therein and the contents of the counter 38, it produces a positive compare signal on comparator output 42. As will be seen hereinafter, the positive compare signal causes the interface and control apparatus (FIG. 4) to sample the video color signals from video terminal outputs 12, 14, and 16 to successively identify the video pixels along the horizontal line being processed. The timing information required to sample the video color signals is developed from the horizontal synch signal. More particularly, the horizontal synch signal is coupled to a phase locked loop 44 which, in conjunction with frequency divider 46, produces a dot clock signal at the output 48. The dot clock signal frequency is selected so as to define 660 dot clock or sample pulses per horizontal line.

Inasmuch as it is assumed that the printer/plotter can print only one dot row at a time and since each printer/plotter pixel comprises two dot rows, the microprocessor 23 causes the video signals representative of each video pixel to be applied to interface and control apparatus 20 twice for each color to be printed. That is, all video signals associated with a given video line to be reproduced on hard copy are applied once to interface and control apparatus 20 to provide printer/plotter control signals for the upper dot row of the printer/plotter pixel and then microprocessor 23 causes the video signals to be reapplied to interface and control apparatus 20 to provide control signals for the lower printer/plotter pixel row.

In accordance with the preferred exemplary embodiment, the printer/plotter 22 employs a hammer bank comprising forty-four individually actuable hammers mounted in spaced relationship along a print row. Such spacing results in each hammer being associated with a print row segment having a width of thirty dot positions. During printer operation, the hammer bank shuttles back and forth across a distance sufficient to allow each hammer to selectively print a dot in each of the thirty dot positions associated therewith. Thus, the hammer bank can print in any one of 1320 (30×44) dot positions along the print row. It will be assumed herein that it is then necessary to increment the paper to print the next dot row.

Since each hammer is the exclusive printing means within a thirty dot print row segment associated therewith, electronic control circuitry (not shown) within the printer/plotter assumes that control signals associated with the first thirty dot positions are serially applied to the actuating mechanism for hammer No. 1. Similarly, printer/plotter control signals associated with dot positions 31–60 are serially applied to the actuating mechanism for hammer No. 2 and so on until the control signals associated with dot positions 1291–1320 are serially applied to hammer No. 44. It should be kept in mind that the hammers are actuated simultaneously; that is, the control signals for dot positions 1, 31, 61—1291 can be applied to the actuators for hammers 1, 2, 3—44 at the same time. The task of the interface and control apparatus 20 is to supply to the electronic control circuitry the 1320 bits required to print each dot row.

Figure 4:
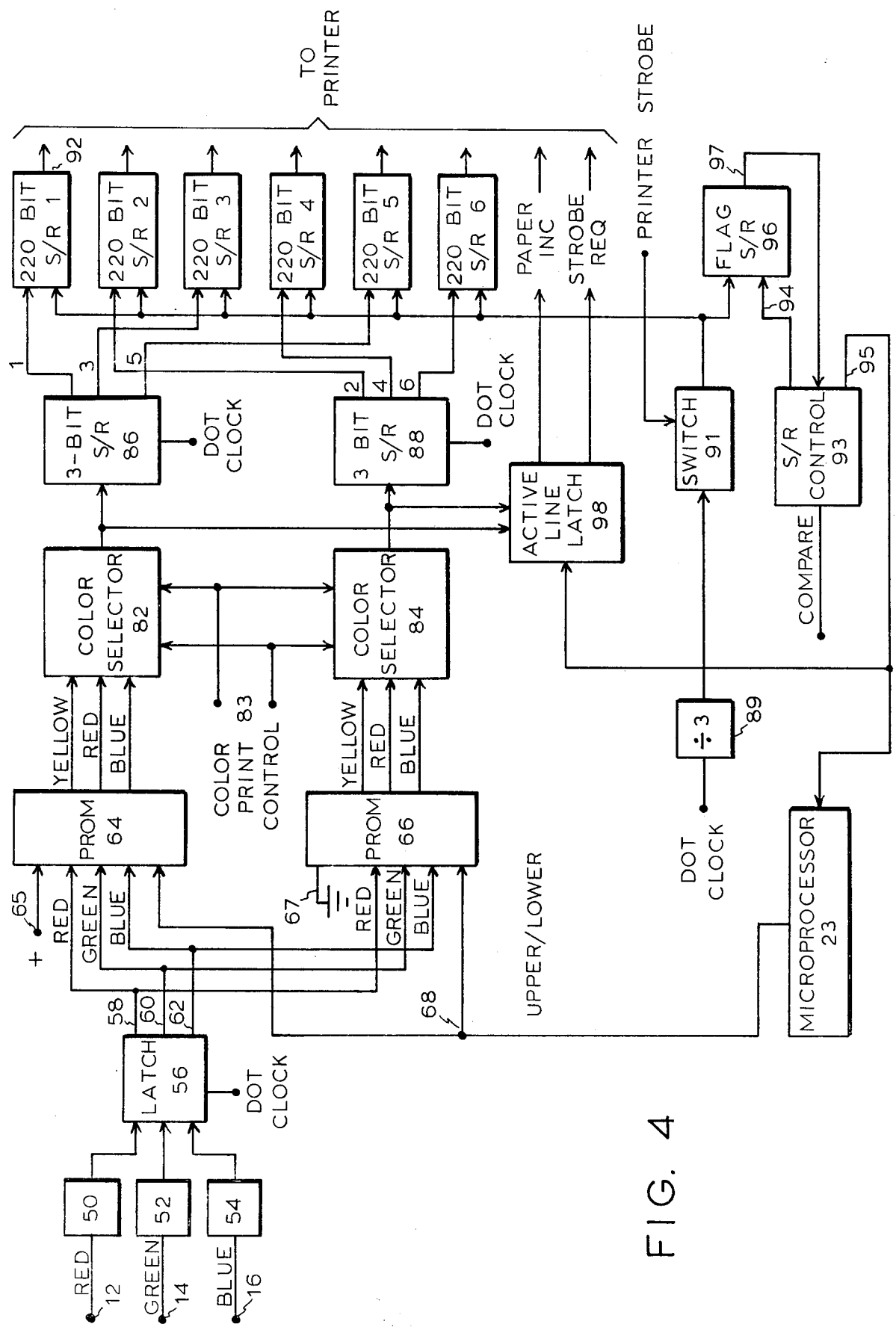
FIG. 4 is a detailed block diagram of the interface and control apparatus.

Attention is now drawn to FIG. 4 which is a block diagram of the interface and control apparatus 20. In the preferred embodiment, color video signals representative of each of the three video pixel dot colors are supplied by video terminal outputs 12, 14, and 16 respectively, to the inputs of level detectors 50, 52, and 54 of interface and control apparatus 20. The level detectors provide output signals respectively indicative of the presence or absence of red, green or blue color information. The outputs from detectors 50, 52, and 54 are coupled to the input of a three bit latch 56. The latch is enabled at the dot clock frequency previously discussed to thus successively load three bit codes into the latch which identify sucessive video pixels. The three bit codes appearing at the output of latch 56 are used to address identically programmed read only memories (PROM) 64 and 66. The PROM 64 is used to supply left dot printer/plotter pixel information and is additionally addressed by input 65 which is always maintained at a true logic level. The PROM 66 is used to supply right dot printer/plotter pixel information and is addressed by input 67 which is always maintained at a false logic level. Each PROM receives a fifth address input at 68 denoted "upper/lower," which is controlled by microprocessor 23, to access different words from the PROMs dependent on whether the upper or lower dot row of a 2×2 printer/plotter pixel is being processed.

As will be better understood hereinafter, during period P1, the Proms 64 and 66 are accessed to provide outputs respectively identifying the colors to be printed in the upper left and right dot positions of the printer/plotter pixel. During period P2, the PROMs 64 and 66 are accessed to provide outputs respectively identifying the colors to be printed in the lower left and right dot positions of the printer/plotter pixel.

The eight possible video pixels are depicted in FIG. 2 and, for reference, are respectively numbered (1)–(8). Considering video pixel (3) as exemplary, Table A below shows the five bit addresses applied to PROMs 64 and 66 during time T1 and T2 and the resulting three bit PROM outputs. Note that video pixel (3) yields a PROM output which defines that a red dot is to be printed in the upper left dot position of the 2×2 printer/plotter pixel and that the other three dot positions are to be left blank.

TABLE A

| | | PROM ADDRESS | | | | PROM OUTPUT | | | | | |
|---|---|---|---|---|---|---|---|---|---|---|---|
| | PROM | L/R | R | G | B | U/L | B | R | Y | B R Y |
| P1 | 64 | 1 | 1 | 0 | 0 | 1 | 0 | 1 | 0 | |
| | 66 | 0 | 1 | 0 | 0 | 1 | | | | 0 0 0 |
| P2 | 64 | 1 | 1 | 0 | 0 | 0 | 0 | 0 | 0 | |
| | 66 | 0 | 1 | 0 | 0 | 0 | | | | 0 0 0 |

In the preferred embodiment, the printer/plotter 22 will be assumed to be of the type disclosed in U.S. Pat. No. 4,289,069. In such a printer/plotter, the paper is moved past the hammer bank in three separate passes with different color dots being printed during each pass. That is, prior to the first pass, a first selected color zone of a multiple color zone ribbon is moved into position adjacent the hammer bank. The paper is then incremented past the hammer bank, dot row by dot row, and all dots of the first color are printed. At the end of the first pass, the paper is reversed and a second ribbon color zone is moved into position adjacent the hammer bank. The paper is then incremented past the hammer bank to print all of the second color dots. At the end of the second pass, a third ribbon color zone is moved into position adjacent the hammer bank. The paper is then incremented past the hammer bank to print all of the third color dots. In accordance with the present invention, it is the task of the interface and control apparatus 20 to supply the appropriate control signals to the printer/plotter 22 during each pass, i.e. 1320 bits for each dot row. Since each line of video pixels is represented by two dot rows, and since three passes are required to complete a multiple color dot row, the apparatus 20 samples the video color signals on six different occasions, i.e. during six separate video frames, in order to print printer/plotter pixels equivalent to a line of video pixels.

Figure 5:
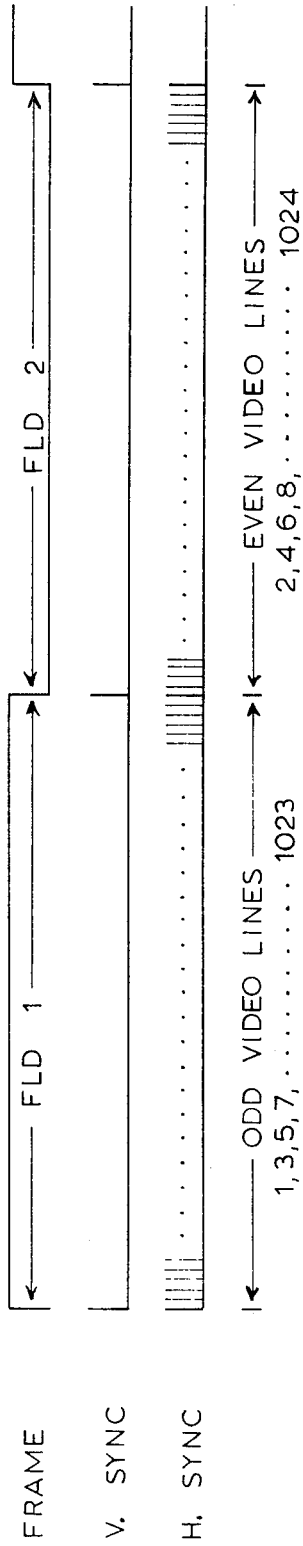
FIG. 5 is a timing diagram depicting various synchronization signals developed by the apparatus of FIG. 3.
Figure 6:
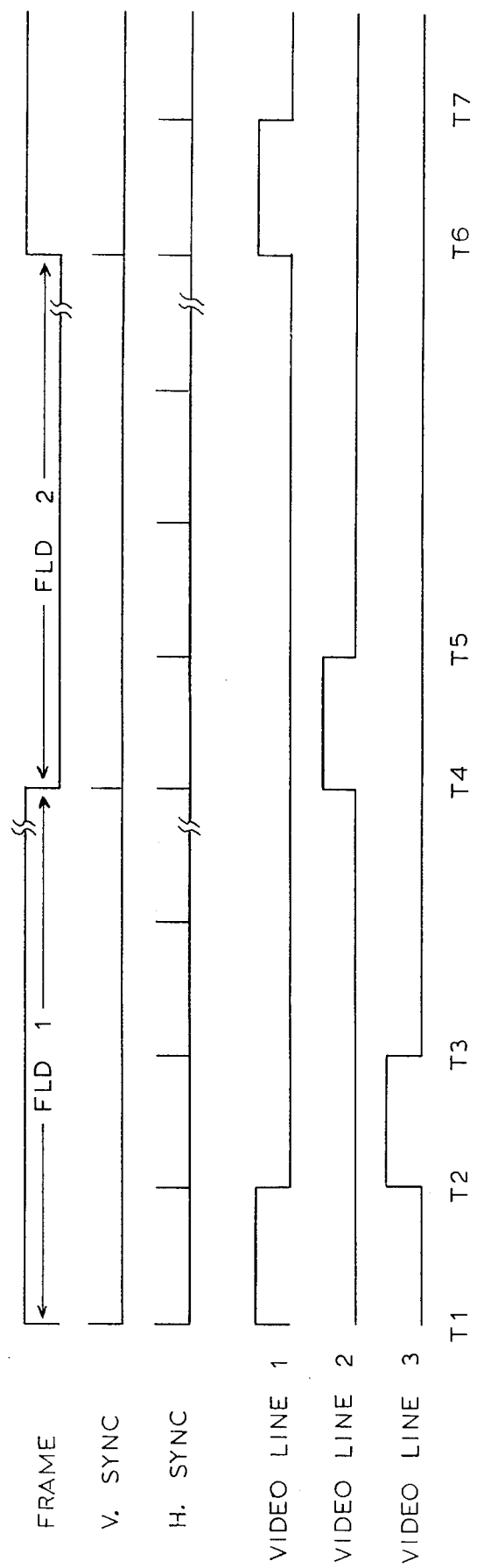
FIG. 6 is another timing diagram on an expanded scale with respect to FIG. 5.

In order to better understand the overall operation of the apparatus 20, attention is directed to FIG. 5 which depicts the video timing and shows that each frame consists of fields 1 and 2. During each field time, 512 horizontal lines are drawn on the video terminal CRT. Inasmuch as the fields are interlaced, for reference purposes, odd numbers have been assigned to field 1 lines and even numbers to field 2 lines. FIG. 6 illustrates the video timing on an expanded scale to show when, during each frame interval, the video terminal outputs 12, 14, 16 can be sampled to derive the video pixel information required to assemble a printer/plotter dot row. Thus, for example, consider the operation when the system is starting to print a new image. The microprocessor will load line 1 into comparator 40. Then, the video color signals (i.e. video line 1) will be sampled and the data stored and translated between times T1 and T2 (FIG. 6). The first dot row (i.e. the upper dots of the printer/plotter pixels) will be printed and the paper incremented between times T2 and T3. During the succeeding frame interval, the video line 1 color signals are again sampled to assembly the next (second) dot row, i.e. the lower dots of the printer/plotter pixels for video line 1. After printing and incrementing, the microprocessor 23 identifies video line 2 by appropriately loading comparator 40. The video color signals are then sampled between times T4 and T5 during successive frame intervals to assemble the third and fourth dot rows to be printed (i.e. containing the upper and lower dots of printer/plotter pixels corresponding to video line 2).

It should be understood from the foregoing that a primary function of the microprocessor 23 is to load comparator 40 to assure that the video lines are sampled in sequence, i.e. 1, 2, 3, 4, 5,—1024, with each video line being sampled twice in successive frame intervals. This sequence assures that apparatus 20 will output dot row data to the printer/plotter in the proper sequence to enable the printer/plotter to build up the image on the incrementally moving paper, dot row by dot row.

Since the outpus of PROMs 64 and 66 comprise simultaneous yellow, red and blue color data signals and the printer/plotter requires control signals corresponding to a single color only during each pass, color selectors 82 and 84 perform a switching function in providing the printer/plotter with data corresponding to such single colors at any given time. In order to accomplish such selective unitary color transmission, a binary color control signal indicative of the color of the ribbon zone adjacent the hammer bank is supplied by the printer/plotter control logic to input 83 of color selector circuits 82 and 84. Responsive to the color control signal, color selector circuits 82 and 84 pass only data corresponding to that particular color. For example, in the preferred embodiment, a binary 00 indicates the yellow, a binary 01 the red, and a binary 10 the blue ribbon zones. Thus, if 00 is applied to input 83 of the color selectors, the color selectors will pass a serial bit stream comprising only yellow color data to the three-bit shift registers 86 and 88.

Three-bit shift registers 86 and 88 are clocked by the dot clock signal described hereinabove. The dot clock signal DC (assumed to be 660 pulses per video line) is also supplied to "divide by three" circuit 89, the output of which passes through switching circuit 91 to provide a clock pulse frequency DC/3 equal to two hundred twenty pulses per video line. The signal DC/3 is used to transfer the contents of shift registers 86, 88 in parallel to six shift registers 92. The six shift registers 92 are respectively identified as 1–6 and each consists of two hundred twenty stages. Thus, the six registers 92 are capable of storing 1320 bits; i.e. one printer/plotter dot row. The three outputs of register 86 are coupled to the inputs of 220 bit shift registers 1, 3, 5 and the three outputs of register 88 are coupled to the inputs of shift registers 2, 4, 6. Thus, left PROM 64 supplies data which is subsequently stored in shift registers 1, 3 or 5 and right PROM 66 supplies data which is subsequently stored in shift registers 2, 4, or 6. Since the data is clocked into shift registers 1-6 at one-third the dot clock frequency, it follows that the three bit shift registers 86, 88 store printer/plotter control signals for three consecutive printer/plotter pixels before transferring such information to the bit shift registers 92.

As explained hereinabove, the occurence of a match between the count in counter 38 (FIG. 2) and the count in binary comparator 40 produces a positive compare signal on output 42. Output 42 is applied to the input of shift register control circuit 93. Responsive to the positive compare signal, shift register control 93 generates "flag in" and "shift register busy" bit signals on outputs 94, 95. The flag in bit is applied to the input of flag shift register 96. Flag shift register 96 is a 220 bit shift register which is clocked by the same DOT clock/3 signal clocking shift registers 92. Thus, as data bytes (i.e. six adjacent bits) are clocked through shift registers 92, flag pulses "1" are clocked through flag shift register 96. The shift register busy signal produced at the shift register control output 95 during the time that data is being stored in shift registers 92 indicates to the microprocessor 23 that a dot row is being assembled.

The output signals from color selectors 82 and 84 are also input to active line latch 98. Additionally, the shift register busy signal on output 95 is applied to the active line latch 98 to indicate that data is being processed. The purpose of the active line latch 98 is to monitor the 1320 bits shifted into registers 86, 88. If all 1320 bits are 0, then the active line latch will provide a signal to the printer to increment the paper one row without transmitting data out of the 220 bit shift registers 92. The reason for this procedure is to save time by not transmitting a print row devoid of print data. If, however, even a single dot print signal occurs in the output of either color selector 82 or color selector 84 during the 1320 pixel sequence, active line latch 98 will supply a signal to the printer to generate a data request in the form of a printer stobe applied to switch 91 to clock printer/plotter control signal bytes out of the 220 bit shift registers 92. The printer strobe signal sequentially clocks each of the 220 six bit bytes contained in the shift registers 92 from the shift register to the printer/plotter 22.

As previously mentioned, a series of "1"s or flags is entered into flag shift register 96 concurrently with the transfer of six bit bytes to the shift registers 92. When 220 bytes have been stored in the shift registers 92, 220 flag bits have also been stored in flag shift register 96 and the first flag bit so stored appears at the output 97 thereof as a "flag out" signal which is applied to shift register control 93. The flag out signal causes shift register control 93 to return flag in and output 94 to "0".

Since the printer strobe pulses applied to the shift registers 92 via switching circuit 91 are also applied to flag shift register 96, it is seen that as each of the bytes is clocked out of the shift registers 92 to the printer/plotter, a flag out bit will be clocked out of the flag shift register 96. As the 220th byte is clocked out of the shift registers 92, the last flag out "1" bit is clocked out of flag shift register 96 and flag out returns to "0" causing shift register control circuit 93 to return the shift register busy signal on output 95 to "0". This indicates to the microprocessor 23 that the interface and control apparatus is now ready to receive the next video line.

Figure 7:
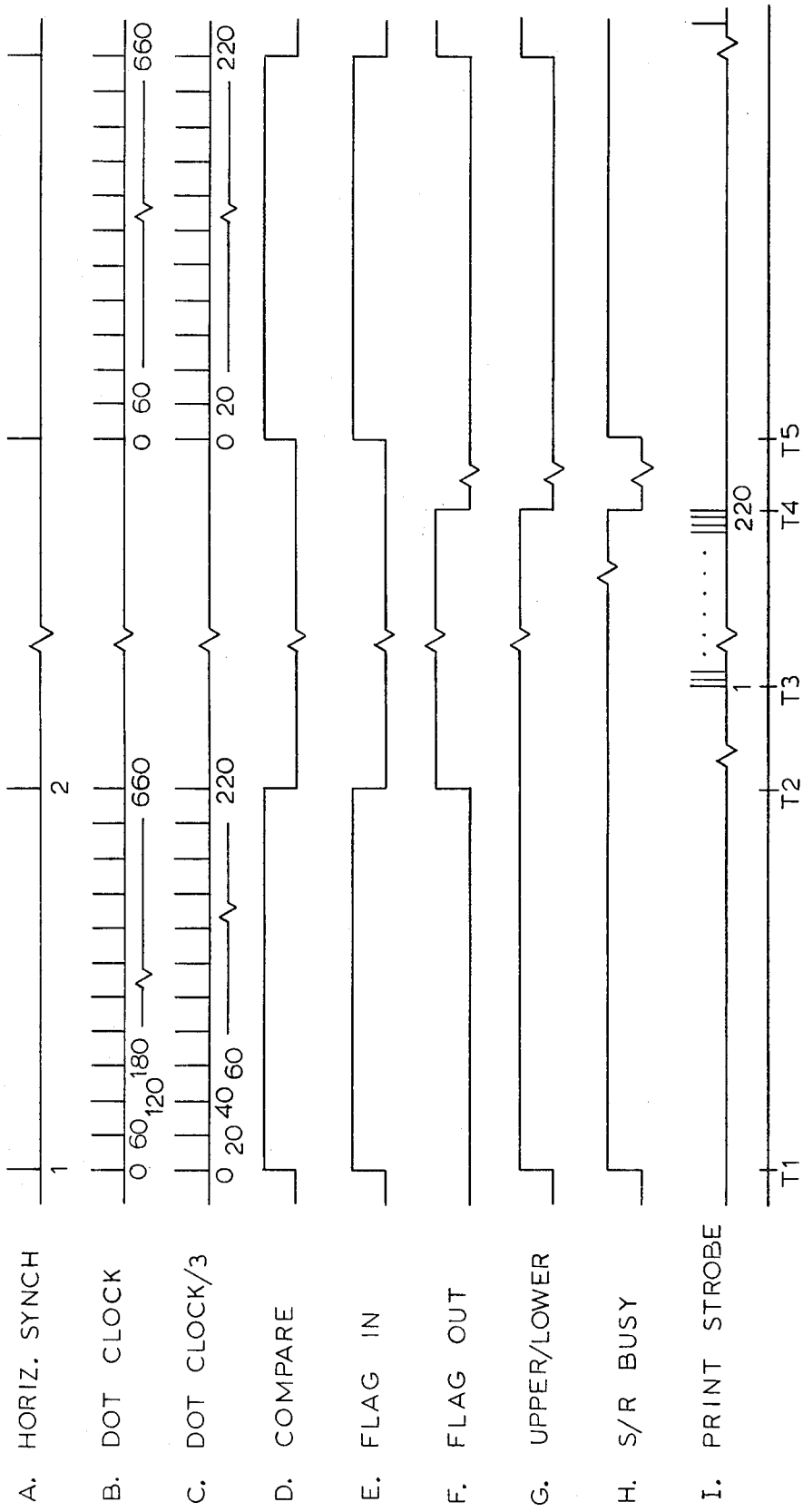
FIG. 7 is still another timing diagram on an expanded scale with respect to FIG. 6.

Reference to FIG. 7 discloses the following timing sequence:

T1—10 bit counter 38 line count equals the line designation stored in comparator 40 to generate a positive compare signal (FIG. 7, line D), flag in (line E) and shift register busy (line H) signals are true;

T2—shift registers 92 have stored printer/plotter control bytes corresponding to full dot row, flag in goes false and flag out signal (line F) goes true;

T3—printer strobes begin;

T4—220th printer strobe occurs, flag out and shift register busy signals goes false and upper/lower signal changes state;

T5—10 bit counter 38 line count equals the line designation stored in comparator 40, to generate a positive compare pulse for stored printer/plotter row.

From the foregoing it should now be apparent that an interface and control apparatus has been disclosed herein which is capable of transforming video color signals from a video source into printer/plotter control signals for reproducing a multiple color pattern on hard copy. It should be understood that although reference herein has been made to a preferred embodiment, that the teachings of the invention are equally applicable to various other embodiments. For example, although the embodiment disclosed herein has been assumed to transform a three-dot video pixel into control signals to create a four-dot pixel, the invention is equally applicable to systems utilizing pixels containing a greater or lesser number of dot positions and utilizing different colors.

Although particular embodiments of the invention have been described and illustrated herein, it is recognized that modifications and variations may readily occur to those skilled in the art and consequently, it is intended that the claims be interpreted to cover such modifications and equivalents.

I claim:

1. In combination with a source of color video signals representing successive video pixels, each video pixel comprising a pattern of three dots which may respectively be of first, second, and third colors, apparatus for controlling a printer/plotter to produce printer/plotter pixels each to replicate a different one of said successive video pixels, each printer/plotter pixel comprising a pattern of four dots including upper left and right dots and lower left and right dots, said apparatus comprising:

sampling means for periodically sampling said color video signals to produce successive multibit codes, each code describing the color pattern of a succeeding video pixel;

memory means having a plurality of addressable locations, each location storing digital information identifying one of at least three different colors for each of upper left and right dots and lower left and right dots;

addressing means responsive to each multibit code produced by said sampling means for accessing the digital information stored in the memory means location identified by said multibit code; and means responsive to said accessed digital information for assembling first and second dot row words to control said printer/plotter, said first dot row word being comprised of digital information identifying colors of upper dots associated with a plurality of printer/plotter pixels and said second dot row word being comprised of digital information identifying colors of lower dots associated with said same plurality of printer/plotter pixels.

2. The combination of claim 1 wherein said means for assembling dot row words includes means for assembling a separate first dot row word for each of said at least three different colors and for assembling a separate second dot row word for each of said at least three different colors.

3. Apparatus for transforming color video signals comprising color data associated with each of a first plurality of color dot positions in each of a succession of color video pixels into control signals for enabling a color printer/plotter to construct printer/plotter pixels comprising a second plurality of dot positions and utilizing at least first and second colors, comprising:
a memory having a plurality of memory locations;
each of said memory locations storing a word comprising a plurality of data bits, each bit associated with a discrete printer/plotter color;
sampling means for periodically sampling said color video signals to produce successive multibit codes, each code describing the color pattern of a succeeding video pixel;
addressing means, responsive to each multibit code produced by said sampling means for addressing a specified locations identified by said code to access the word stored therein;
means, responsive to each of said accessed words for utilizing a portion of each such accessed word to provide a printer/plotter control signal for a specific dot location in a printer/plotter pixel.

4. The apparatus of claim 3 wherein said color video pixels define a number of discrete dot positions different from the number of discrete dot positions defined by said printer/plotter pixels.

5. The apparatus of claim 3 wherein said color video pixels have a first group of discrete colors associated therewith and said printer/plotter pixels have a second group of discrete colors associated therewith and wherein said first group of colors contains at least one color not contained in said second group of colors.

6. The apparatus of claim 3 wherein said printer/plotter is a dot impact printer/plotter capable of printing a plurality of print rows on a web, each row comprising R dot positions and wherein said apparatus includes data storage means for storing R discrete printer/plotter control signals.

7. In combination with a color printer/plotter capable of selectively printing or plotting in each of N different colors, apparatus for transforming color video signals representative of color data embodied in a succession of three dot color video pixels into printer/plotter control signals for constructing a succession of four dot printer/plotter pixels, comprising:
a decoder for translating said color video signals into successive data bytes, each byte comprising at least N color data bits;
each of said N printer/plotter colors having at least one of said N color data bits associated therewith;
color signal selector means, responsive to said data bytes for selectively providing said color printer/plotter with successive printer/plotter control signals corresponding to each of said N printer/plotter colors; and
means for associating each of said control signals with a discrete dot position in one of said printer/plotter pixels.

8. In combination with a source of color video signals representative of color video pixels comprising X dot locations and a printer/plotter for printing pixels comprising Y dot locations in at least first and second colors, a controller for producing printer/plotter control signals in response to said color video signals, comprising:
a memory comprising first through Nth memory locations, each location storing a word comprising at least one discrete color data bit for each printer/plotter color;
addressing means responsive to said color video signals for accessing selected locations in said memory corresponding to specific dot locations in said printer/plotter pixels;
selector means responsive to said words in said accessed memory locations for providing a first data stream for said printer/plotter;
said first data stream comprising a succession of printer/plotter control signals corresponding to said first printer/plotter color for causing said printer/plotter to print a first color pattern in selected dot locatins in said printer/plotter pixels; and
said selector means including means responsive to said words in said accessed memory locations for providing a second data stream comprising a succession of printer/plotter control signals corresponding to said second printer/plotter color for causing said printer/plotter to print a second color pattern in selected dot locations in said printer/plotter pixels.

9. The controller of claim 8 further including storage means for storing each succession of printer/plotter control signals for subsequent transmission to said printer/plotter.

* * * * *